United States Patent [19]

Frecka

[11] 4,237,408
[45] Dec. 2, 1980

[54] METHOD AND APPARATUS FOR MODIFYING THE OPERATION OF A MACHINE TOOL AS A FUNCTION OF TORQUE

[75] Inventor: Thomas R. Frecka, Cincinnati, Ohio

[73] Assignee: Cincinnati Milacron Inc., Cincinnati, Ohio

[21] Appl. No.: 65,583

[22] Filed: Aug. 10, 1979

[51] Int. Cl.³ .............................................. G05B 19/24
[52] U.S. Cl. ..................................... 318/571; 318/39; 364/475
[58] Field of Search ................. 318/39, 571, 600, 569, 318/434, 432; 364/475, 474

[56] References Cited

U.S. PATENT DOCUMENTS

| | | | |
|---|---|---|---|
| 2,830,310 | 4/1958 | Smith | 408/9 |
| 3,019,640 | 2/1962 | Engelman | 73/136 R |
| 3,259,023 | 7/1966 | Reiger et al. | 318/39 X |
| 3,325,710 | 6/1967 | Reynolds | 318/39 |
| 3,389,313 | 6/1968 | Reynolds | 318/39 |
| 3,418,549 | 12/1968 | Emerson | 318/39 |
| 3,446,099 | 5/1969 | Lesher et al. | 318/8 X |
| 3,573,588 | 4/1971 | Geyer | 318/39 X |
| 3,896,360 | 7/1975 | Meyer et al. | 318/39 X |
| 4,066,942 | 1/1978 | Bardwell et al. | 318/434 |
| 4,076,442 | 2/1978 | Cox et al. | 408/8 |
| 4,150,327 | 4/1979 | Camera et al. | 318/571 X |
| 4,173,786 | 11/1979 | Kuhnell et al. | 318/571 X |

Primary Examiner—B. Dobeck
Attorney, Agent, or Firm—C. Richard Eby

[57] ABSTRACT

A method and apparatus are disclosed for controlling a machine tool as a function of the torque load on a cutting tool. The apparatus detects the spindle motor current which may vary over four decades, the spindle motor voltage which may vary over two decades and the cutting tool angular velocity which may vary over three decades. The decimal values of the detected variables are converted to corresponding logarithmic values and stored in digital form. A microprocessor utilizes the stored values to calculate the value of torque on the cutting tool which may vary over five decades. A microprocessor determines the idle torque by averaging the torque which is measured several times over one spindle revolution. The idle torque is subtracted from subsequent gross torque measurements to provide an indication of actual cutting load on the tool. The operation of the machine is modified in response to the actual torque exceeding a predetermined reference torque value.

12 Claims, 7 Drawing Figures

METHOD AND APPARATUS FOR MODIFYING THE OPERATION OF A MACHINE TOOL AS A FUNCTION OF TORQUE

BACKGROUND OF THE INVENTION

The invention relates generally to the area of numerically controlled machine tools: and specifically, the invention provides a method and apparatus for controlling the operation of a machine tool as a function of the cutting torque load on a rotating spindle. There are a great number of machine tool control systems in the prior art. Of particular interest in this application are systems in which torque is the measured control variable. However, the principle claimed herein is applicable to many other systems.

Torque is typically a viable control variable in the drilling process. There are three major variations in the drilling process, and the merit of a control system lies in its ability to adjust for these variations. First, there are changes in the material being drilled. This is caused by changes in material hardness and changes in machineability. Second, the control system must be capable of accomodating changes in the drill. Torque changes will occur because of chip clogging in the drill flutes, and torque will change as a function of the relative sharpness of the drills. Third, the control system must be capable of controlling the machine operation when the drill breaks through from the workpiece into air. Not only does this occur when drilling throughholes, but also when encountering cross holes within the workpiece. The torque control system must sense the rise in torque caused by any one or more of the above variables and decrease the feed rate so as to maintain the torque within the desired limits. When utilizing a machine without a torque control, the operator has to ensure that the torque does not build up excessively in the worst case. Therefore, the machine must be operated in a conservative manner. Since the torque control adjusts the feed rate to changing cutting conditions, the machine can generally be operated at a higher average feedrate.

It is a well-known fact that torque may be measured by sensing spindle motor current and voltage to determine the power supplied by the spindle motor and further sensing the angular velocity of the cutting tool to determine the torque. A number of torque sensitive controls have been commercially available which utilize the above general relationship to determine torque and modify the machine operation as a function thereof. Typically, traditional systems are fully analogue which results in several inherent disadvantages.

The most significant disadvantage is that a single linear scale must be used to define the full range of the measured torque variable. A typical linear range for analog devices is 10 volts. A typical range of spindle motor current is 100 milliamps to 120 amps., i.e., a range of 4 orders of magnitude or decades. Consequently, the analog transducers must have millivolt sensitivity without any loss of resolution—an expensive requirement to satisfy.

The problem is compounded further by the necessity of multiplying the current and voltage variables to obtain power. For the magnitudes previously mentioned, the analogue multiplier must have a range of seven orders of magnitude or decades. This is a practical impossibility for commercially available components which can be economically used. It is readily obvious that the dynamic range of a linear system must be limited to under three orders of magnitude or decades, and therefore such a system has severe inherent limitations in the present application.

To improve the capability and versatility of the control system, a microprocessor based system is desirable; however, new problems are introduced which are not found in the analogue system. These problems relate to diagnostic procedures, communication with other elements in the system and the determination of torque itself. Each torque measurement requires that the variables defining torque be measured, the value of torque be calculated, the amount of excessive torque be determined and a remedial action be taken in time to protect the tool.

In contrast to an analogue system in which the variables may be measured at any time or on a continuous basis; in a digital system, the variables can only be sampled at a particular instant in time. This poses a difficult problem in determining the torque at idle or in a no-load condition. The idle torque can vary over a two-to-one range during a single spindle revolution; therefore, a single sample of the variables is inadequate. Consequently, the variables defining torque must be sampled several times during a single spindle revolution. From these idle torque samples a reasonable average idle torque can be determined and stored.

The general problem of determining torque and the particular problem of detecting the idle torque is further complicated by the necessary range of operation of the system. For example, a typical maximum spindle speed is 6000 revolutions per minute; and to achieve a reasonable number of idle torque samples, e.g. 10 samples per revolution, the system must be capable of making a torque determination every millisecond. In one millisecond, the system must measure the spindle motor current, voltage and speed; multiply the current times the voltage; divide the product by the speed and store the quotient. Therefore, even though the decision to use a microprocessor based system may conceptually eliminate the limitations of the analogue based systems, new problems relating to torque detection and determination must be solved.

The disclosed invention provides a torque control system capable of measuring torque over five orders of magnitude which provides the necessary idle sampling values and which allows more flexibility in the area of machine control.

SUMMARY OF THE INVENTION

According to one embodiment, a method and apparatus are claimed for controlling the operation of a machine tool as a function of the torque load on a rotating cutting tool caused by the cutting tool being in contact with a workpiece. The machine has a spindle motor for rotating the cutting tool and a feed motor for providing relative motion between the tool and workpiece. The invention provides a first means for detecting a current signal representing a spindle motor current which may occur over a range of four decades. A voltage signal is detected representing a voltage across the spindle motor which may occur over a range of two decades. A speed signal is detected representing an angular velocity of the tool which may occur over a range of three decades. The invention provides a means for converting the current, voltage and speed signals into corresponding log current, log voltage and log speed signals representing the logarithmic values of the current, voltage and speed signals, respectively. Means are provided for generating a torque signal representing a torque load on the cutting tool which may occur over a range of five decades. The torque signal is compared to a predetermined reference torque signal, and means are provided for modifying the operation of the machine in response to the torque signal exceeding the reference torque signal.

BRIEF DESCRIPTION OF THE PREFERRED EMBODIMENT

Figure 1:
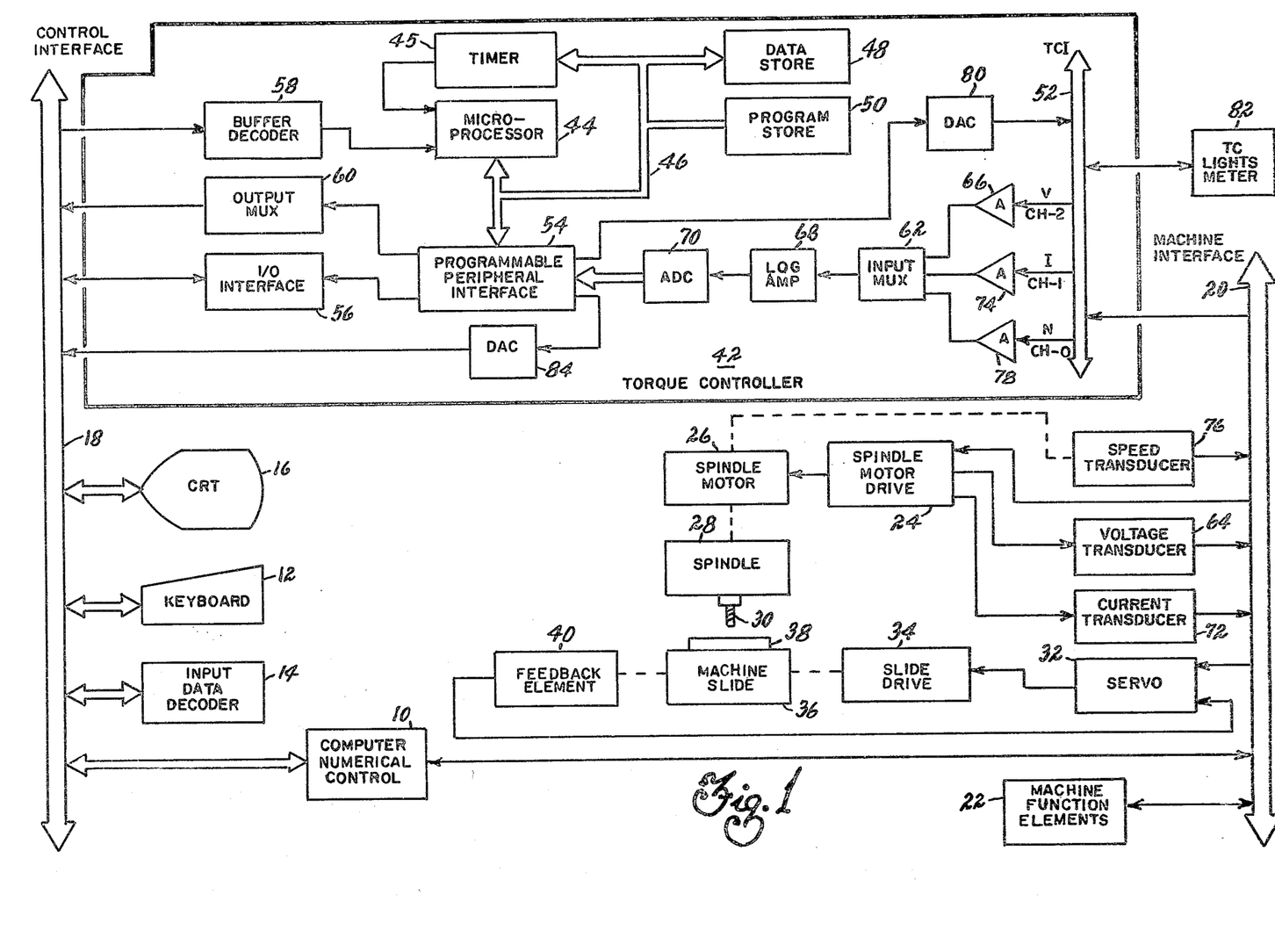
FIG. 1 is a general block diagram illustrating how the torque control system may be integrated with a standard computer numerical control.

FIG. 1 is a general block diagram illustrating how the claimed torque control system may be utilized with a standard computer numerical control 10. An input data decoder 14, keyboard 12 and CRT 16 may be used to transfer programmed and process control information to and from the control 10. The control 10 responds to the information from the control interface 18 to generate output signals to the machine via a machine interface 20. The control 10 distributes process information to and receives input information from specific machine function elements 22, e.g. lights, limit switches, push buttons, solenoids, etc. One element of machine function information determines the operation of the spindle motor drive 24 which controls the operation of the spindle motor 26. The motor 26 is mechanically coupled to a spindle 28 which holds a rotating cutting tool 30.

The control 10 also generates slide information in the form of command signals to a servoamplifier 32 which produces a drive signal to a slide drive 34. The slide drive 34 is mechanically coupled to a machine slide 36 supporting a workpiece 38 and thereby providing relative motion between the cutting tool 30 and the workpiece 38. A feedback element 40 detects the actual slide motion which allows the servoamplifier to terminate the machine slide motion when the commanded position is achieved. It should be noted that only relative motion between the cutting tool and workpiece is important; how the relative motion is achieved is not germane.

The elements described thus far are standard numerical control elements and are used for example in the ACRAMATIC computer numerical control manufactured by Cincinnati Milacron Inc. The exact details of the association of elements shown in FIG. 1 may obviously vary from one control to another and therefore should not be considered a limitation on the present invention.

A torque controller 42 contains a microprocessor 44 which is connected via a data bus 46 to a data store 48 and program store 50. A programmable peripheral interface 54 controls the transfer of all information to and from the torque controller 42. The I/O interface 56 transfers commands to the controller 42 and interrupt requests to the control 10. The torque controller 42 receives data from the peripherals 12 and 14 and the control 10 via the decoder 58; and the torque controller transfers data back to the control interface 18 by means of the output multiplexer 60.

Upon a command from the control 10, the peripheral interface 54 will cause the multiplexer 62 to sample an input signal from the machine. When multiplexing channel-2, the voltage transducer 64 senses a spindle motor voltage in the range of from 10 to 1000 volts. The output from the transducer 64 is transferred via the machine interface 20 and torque control interface 52 to an amplifier 66 which provides buffering and scaling functions. After being transferred through the input multiplexer 62, a logrithmic amplifier 68 produces a log voltage signal representing the logrithmic value of the voltage signal. An analog-to-digital converter 70 provides a digital log voltage signal which is stored in the data store 48. Next, the microprocessor 44 causes the input multiplexer 62 to sample channel-1, and the current transducer 72 detects spindle motor current in the range of from 100 milliamps to 1000 amps. An output signal from the current transducer 72 is transferred into the controller 42 and scaled by the amplifier 74. As previously described, a digital log current signal is generated and stored. In a similar manner, the input multiplexer 62 multiplexes channel-0, and a speed transducer 76 detects a spindle speed in the range of from 10 to 10,000 revolutions per minute. The output of the speed transducer is transferred to amplifier 78 and a digital log speed signal is produced and stored.

As will be subsequently described, these input signals are utilized to produce a torque signal in the range of from 0.1 to 1000 foot pounds which is compared to a predetermined torque reference. If the actual torque exceeds the reference signal, a modified feedrate signal is produced. This signal is provided in analog form by the digital-to-analog converter 80 to a torque control panel 82 which contains push buttons, lights and a meter for selectively monitoring cutting torque or the controlled feedrate, typically as a percentage of the programmed feedrate value. Another digital-to-analog converter 84 provides a feedrate modification signal back to the control 10.

Figure 2A:
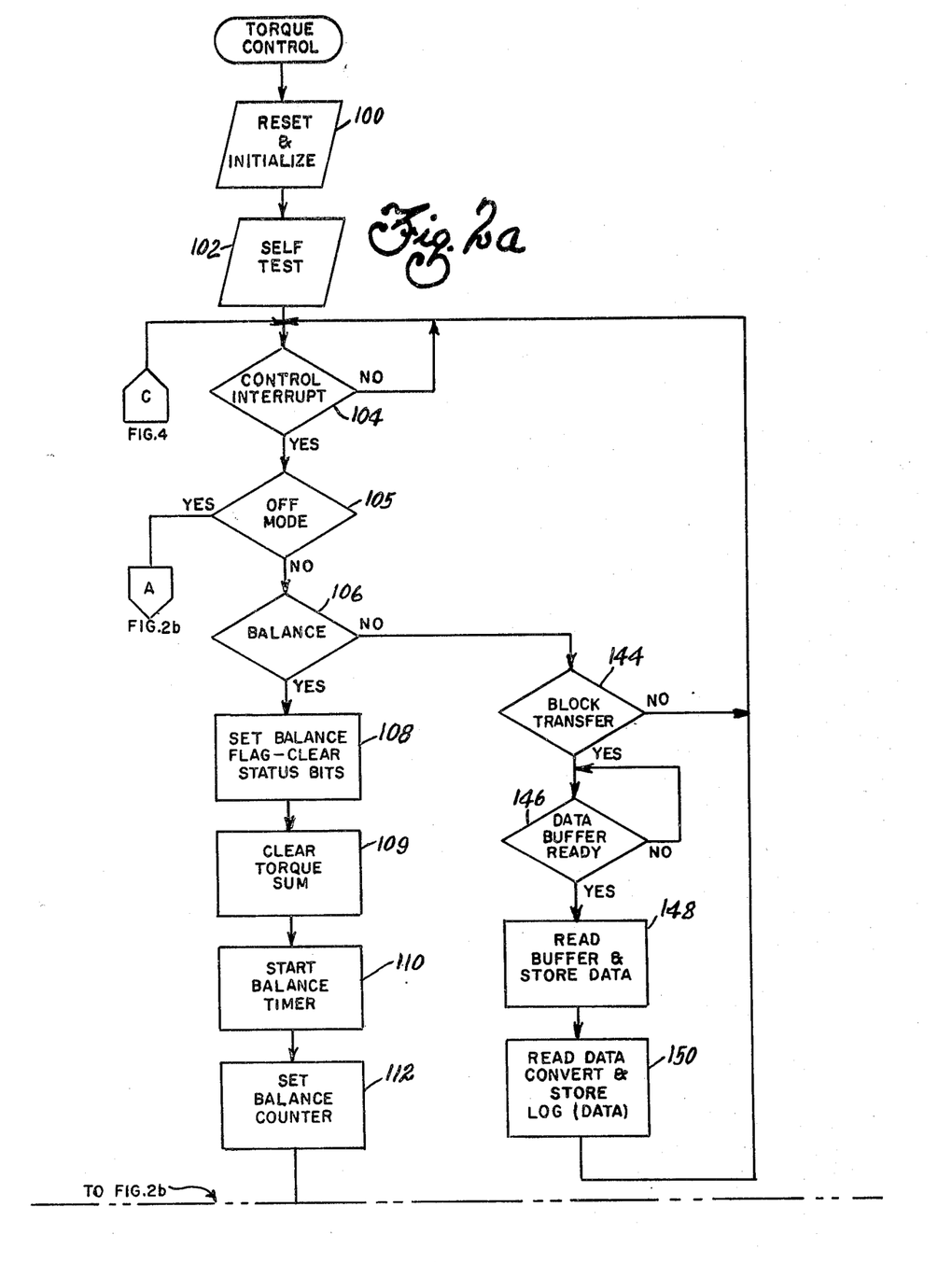
FIGS. 2a and 2b when joined along the indicated junction line illustrate the process executed by the apparatus disclosed in FIG. 1.
Figure 2B:
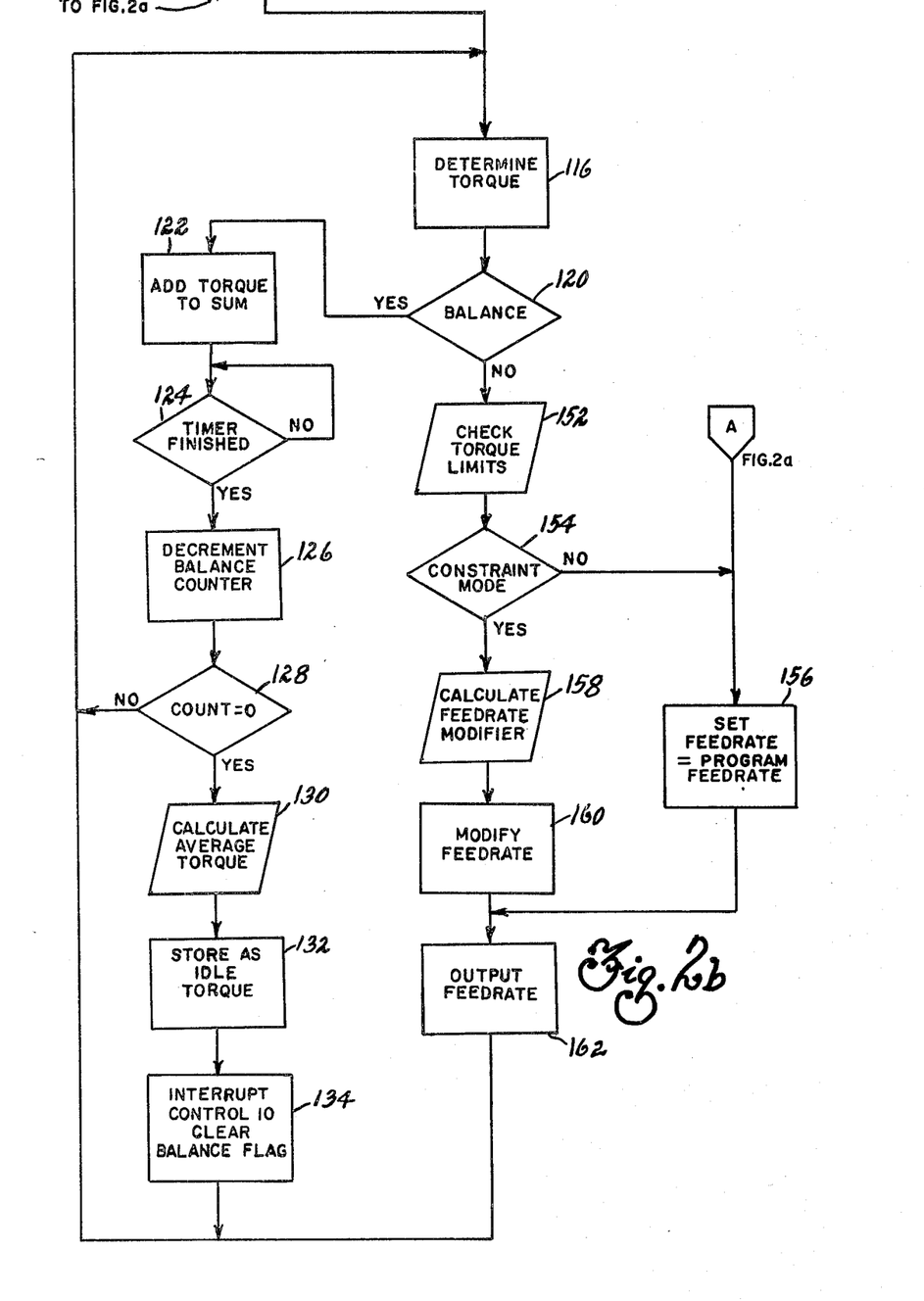

FIGS. 2a and 2b when joined along the indicated junction line illustrate the general process which is exercised by the apparatus disclosed in FIG. 1. As in any digital system, upon the application of power, the system must be reset and initialized. This operational step is indicated by the subroutine 100. Immediately thereafter, the system exercises a self testing step in order to check the proper operation of the various elements. Although this step is not an absolute necessity, a system diagnostic test is commonly utilized. Since this self test feature does not form a part of the claimed invention, it will not be described in any further detail. Next, the system looks for an interrupt from the control 10. As mentioned earlier, the control 10 defines the mode of operation of the torque controller. There are basically three modes of operation—an off mode, balance mode, and block transfer mode.

In decision block 105, the system checks whether the control 10 is ready for the torque controlled operation. The torque controller operates continuously unless it is turned off by the control 10. There are many nonmachining operations in which the torque controller is not required, e.g. machine start-up, spindle reverse, etc. In these situations, the control 10 sets the torque conroller in the off mode, and the process moves to step 156 which sets the feed rate to the programmed value.

In decision block 106, the system checks to determine whether the control 10 has requested a balance mode. The purpose of the balance mode is to establish the idle or no load torque on the spindle motor. Process step 108 sets a balance mode flag and clears relevant status bits. Process step 110 starts a balance timer. As mentioned earlier, the determination of the idle torque requires that the torque be sampled several times during a single spindle revolution. As a matter of design convenience, the described apparatus executes eight samples during a single revolution. Given that eight samples are required and knowing the angular velocity of the spindle, the time required for the spindle to rotate ⅛ of a revolution may be determined; and this time is defined for the balance timer. Therefore, the balance timer provides equally spaced torque samples within a single spindle revolution. Process step 112 causes a balance counter to be set to the number of torque samples that will be made during one revolution of the spindle, i.e. eight.

The process moves to subroutine 116 which requires that a torque determination be made. After a torque value is generated, decision block 120 recognizes the balance mode of operation and moves the process to step 122 which requires that the torque value be summed with other torque readings taken during the balance process. Decision block 124 determines whether or not the balance timer has run out. After the timer runs out, the process step 126 decrements the balance counter; and if the balance counter still has a count greater than zero, the process returns to step 116 which requires that another torque determination be made. As determined by the balance timer 110, the next torque reading will occur ⅛ of a revolution after the first torque determination was made.

The process continues as previously described and iterates through blocks 116 through 128 until eight torque determinations have been made. After the eighth torque determination, the torque sum from step 122 will represent the sum of the eight torque readings. The balance counter will be at zero, and the process will move to subroutine 130 which requires the calculation of the average torque. Obviously, this calculation will comprise dividing the torque sum from step 122 by the number of torque readings made, i.e. eight in the preferred embodiment. Process step 132 stores the average torque value, and process 134 provides an interrupt to the control 10 indicating that the balance process is complete and the torque controller has determined a value for the no load or idle torque.

Returning to block 106, if the control has not defined a balance mode, it may define a block transfer mode. This mode is detected by process step 144. In this mode, data is transferred from the control 10 to the torque controller. The data defines the reference torque values which will be subsequently described. Each block of data is comprised of a number of bytes which are serially transferred. Decision block 146 checks whether the transfer of a byte of data to the controller buffer is complete. If the transfer is not complete, the process loops around step 146. When the transfer is complete, process block 148 reads the data in the buffer and transfer it to the data store. Process block 150 reads the torque constraint limit from the data store, generates the log value of the limit and transfers the log value back to the data store. Log and antilog values may be determined by a number of techniques. However, a simple method is to store log and antilog tables in the program store. Therefore, only a simple table look-up is required. The process then returns to block 104 to await another instruction from the computer.

Prior to machining, the idle torque is determined by executing the process in steps 106 through 134. After the balance mode is complete, decision block 120 moves the process to process step 152 which checks the current torque value against predetermined torque reference limits. If required, process step 158 determines a feedrate modifier; and process step 160 modifies the feedrate. This modified feedrate is output to the control 10 via process step 162. The process then returns to step 116, and a new torque value is determined. The process continues in this mode of operation until the control 10 torque value drops below the reference limit which initiates the constraint mode.

Figure 3:
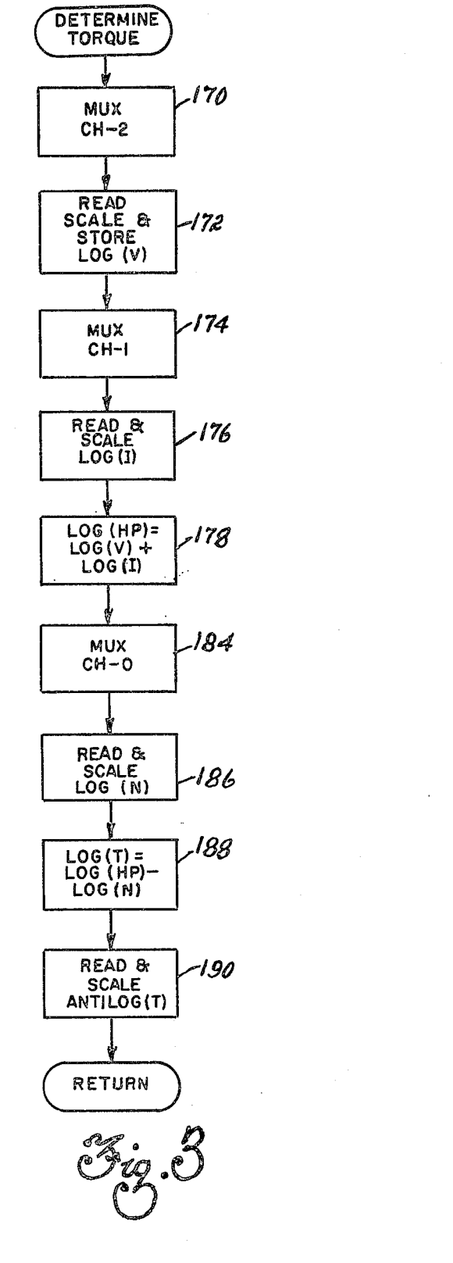
FIG. 3 is a flow chart of a routine for determining the torque value.

FIG. 3 is a flow chart illustrating the steps required to determine torque. As previously described, in order to sample the input variables for the determination of torque, the input multiplexer 62 multiplexes between its input channels 0 through 2. Therefore, process step 170 calls for the multiplexer to open channel 2. This allows the voltage from the voltage transducer 64 to be transmitted through the amplifier 66, input multiplexer 62, log amplifier 68 and analog-to-digital converter 70. As required by step 172, the digital log voltage signal is read and stored in the data store 48. Next, process step 174 commands the input multiplexer to open channel 1. Process step 176 reads the current signal from the transducer 72 on channel 1 which is the digital log current signal representing the logarithm of the current value detected by the transducer 72. The digital log current signal is added to the digital log voltage signal in step 178. This sum is a digital log power signal representing the power generated by the spindle motor. Next, the microprocessor 44 commands the input multiplexer 62 to multiplex channel-0 as described in process step 184. This produces a digital log velocity signal representing the logarithmic value of the angular velocity which is detected by the transducer 76 and read in process step 186. The digital log velocity signal is subtracted from the digital log power signal by process step 188 to produce a digital log torque signal. In process step 190, a table look-up operation is exercised to determine the digital torque signal using an antilog table stored in the program store 50.

As mentioned earlier, by storing the logarithmic value of the voltage, current and speed input variables, the system can operate over a range of decades or orders of magnitude of the input variables which were heretofore unattainable. Likewise, a range of torque values of over five decades is now practical. The logarithmic state of the input variables has a further advantage in that the complex calculation of torque requiring multiplication and division can now be achieved via a simple addition and subtraction of the log values. As will be appreciated by those who are skilled in the art, with more advanced microprocessors, the antilogs of the stored input variables may be obtained; and the torque may be calculated by executing the multiplication of the voltage and current variables and the division of this product by the speed variable.

Figures 4, 5:
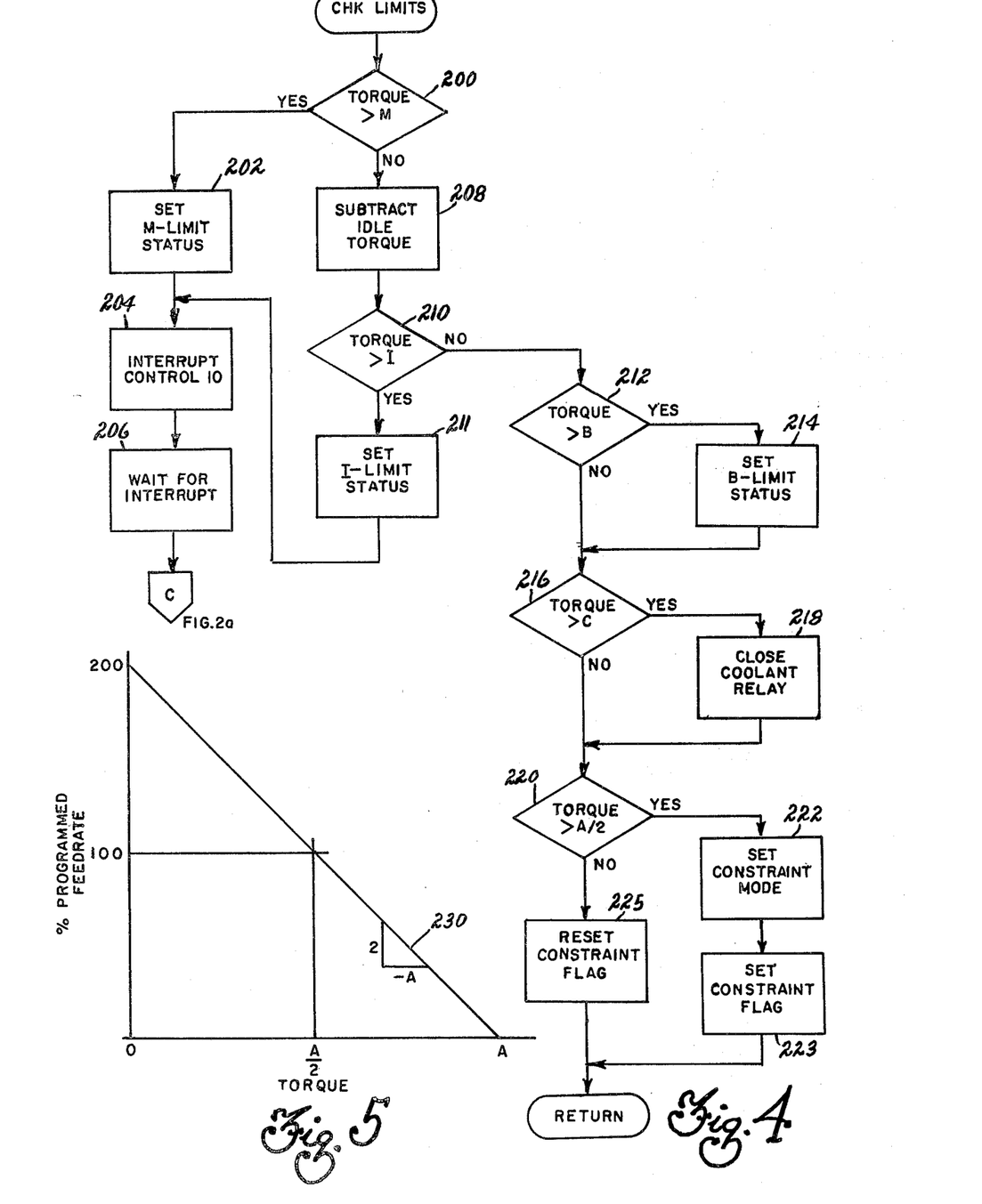
FIG. 4 is a detailed flow chart of a routine for checking the calculated torque value against a number of predetermined reference torque values.
FIG. 5 is a graphical representation of the torque constraint mode of operation.

FIG. 4 is a flow chart illustrating the steps required to check the torque signal against some predetermined reference torque values. The reference torque values recited below are only examples illustrating the versatility of the torque controller, and they should not be interpreted as limiting the application of the claimed invention.

A first torque value arbitrarily referred to as the M-value represents a catastrophic torque limit relative to the machine structure. Process step 200 determines whether the torque signal is greater than the M-reference limit. If it is, process step 202 sets the M-limit status, process step 204 interrupts the control 10; and the process then awaits the activation of the interrupt via step 206. It should be noted that the comparison in step 200 represents the gross torque. Process step 208 subtracts the previously determined idle torque from the gross torque determination to generate a net torque signal representing the actual cutting forces on the cutting tool.

Process step 210 compares the actual torque signal to a predetermined torque reference arbitrarily identified as the I-limit. The I-limit represents an actual torque limit that is catastrophic to a particular tool; and if this torque limit is exceeded, the machining process should be terminated immediately. If process step 210 detects an excessive torque limit, process step 211 will set the I-limit status bit. Process 204 will interrupt the control 10, and the process will await an interrupt in accordance with step 206.

If process step 210 does not detect an excessive torque limit, process step 212 checks whether the actual torque signal exceeds another torque limit arbitrarily identified as the B-limit. The B-limit represents a minimum amount of torque that should be present if a cutting tool is in contact with the workpiece. If this minimum torque does not exist, most probably the cutting tool is broken. If this minimum torque limit is detected, process step 214 sets the B-limit status bit.

Process step 216 determines whether the actual torque is greater than another torque limit arbitrarily assigned the C-limit. The C-limit represents a torque value indicative of tool contact with the workpiece. The C-limit is used to control the initiation of coolant flow when through-the-tool coolant is being used. When the cutting torque value exceeds the C-limit, process step 218 results in the coolant flow being initiated. When the torque value falls below the C-limit, the C-limit causes the coolant flow to be terminated.

Process step 220 determines when the cutting torque limit exceeds one-half of the A-limit. The A-limit represents the amount of torque at which the feedrate is brought to zero. The zero value represents the bottom end of a torque constraint mode of operation. The constraint mode is set by block 222 when the torque exceeds one-half of the A-limit, and the constraint mode flag is set by process block 223. At this point, the feedrate is reduced to zero in direct proportion to the increase in torque such that the feedrate is reduced to zero when the torque equals the A-limit. If the measured torque is less than one-half the A-limit, process step 225 resets the constraint flag; and the constraint mode is terminated.

FIG. 4 illustrates the versatility of the disclosed control system. As opposed to the earlier control systems in which only a constraint mode was utilized, the current disclosure provides a completely different mode of torque control, i.e. a torque limit control. In contrast to the constraint mode of control in which the feedrate is automatically reduced as a function of the increase in torque, the torque limit control provides a signal to the computer numerical control defining a particular torque dependent machining situation. The computer numerical control is then operative to execute process steps which are compatible with the detected torque limit.

FIG. 5 graphically illustrates the torque constraint mode of operation. A maximum torque value A is predetermined and is a function of the torque value which would cause tool breakage. Normally, the feed rate is equal to 100% of its programmed value. However, when the torque signal exceeds one-half of the A-value, the system enters a constraint mode of operation; and the feed rate is reduced in direct proportion to the increase of torque. Consequently, when the torque reaches the A-value, the feed rate will have a zero value; and tool breakage should be avoided. Therefore, knowing the A-value and the slope of the torque constraint curve 230, the desired percentage of the programmed feed rate may be calculated for torque values in excess of one-half of the A-value.

In process step 152 of FIG. 2(b), the system checks the measured torque against the torque limits. Specifically, in decision step 220 of FIG. 4, the measured torque is compared to one-half of the A-value. If the measured torque is greater, the constraint mode is set in step 222; and the constraint flag is set in step 223. Returning to FIG. 2(b), since the constraint mode is set, decision block 154 moves the process to step 158 to calculate the feed rate modifier.

Figure 6:
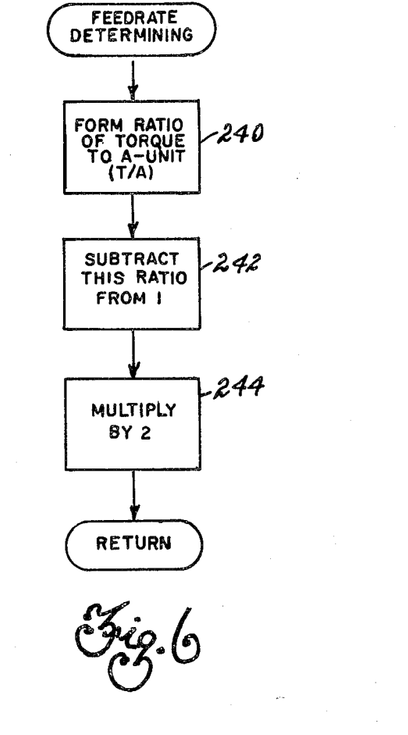
FIG. 6 is a detailed flow chart of a routine for determining a feedrate modifier value in response to the calculated torque exceeding one of the predetermined reference torque values.

FIG. 6 is a flow chart illustrating the steps which are necessary to determine a new feed rate modifier. In accordance with the graph of FIG. 5, the rate modifier may be determined by the formula: %F=2(1-T/A). Therefore, in process step 240, the ratio of the torque to the A-limit is determined. In step 242, this ratio is subtracted from unity; and in step 244, the above differences is multiplied by two. The process then returns to block 160 of FIG. 2(b) which requires that the feed rate modifier be multiplied by the programmed feed rate thereby producing a new constraint feedrate value.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for modifying the operation of a machine tool as a function of the torque load on a rotating cutting tool caused by the cutting tool being in contact with a workpiece, the said machine tool having a spindle motor for rotating the cutting tool and a feed motor for providing relative motion between the tool and the workpiece in response to command signals from a numerical control, the apparatus comprising:

(a) means responsive to the spindle motor for producing a voltage signal representing a spindle motor voltage magnitude occurring within a range of two decades;

(b) means responsive to the spindle motor for producing a current signal representing a spindle current magnitude occurring within a range of four decades;
(c) means responsive to the spindle motor for producing a speed signal representing a spindle motor velocity occurring within a range of three decades;
(d) means responsive to the voltage, current and velocity signals for generating corresponding log voltage, log current and log speed signals representing logarithmic values of the voltage, current and speed signals respectively;
(e) data storage means for storing the log voltage, log current and log speed signals; and
(f) computer means including a processor, program store and interface means for
 (1) controlling the detection, conversion and storage of the signals representing the voltage, current and speed of the spindle motor, and
 (2) determining a torque signal in response to the stored log voltage, log current and log speed signals, said torque signal representing a spindle motor torque being generated within a range of five decades, and
 (3) providing a control signal to the numerical control in response to the torque signal exceeding a predetermined reference torque signal.

2. The apparatus of claim 1 wherein the voltage, current and speed signals represent analog values of the spindle motor voltage, current and speed, respectively, and the apparatus further comprises an analog-to-digital converter responsive to the log voltage, log current and log speed signals for producing digital log voltage, digital log current and digital log speed signals respectively, representing the digital values corresponding to the detected analog signals.

3. The apparatus of claim 2 wherein the computer means further includes a peripheral interface means in electrical communication with the numerical control and being responsive to command signals generated by the numerical control for activating one of several operating modes of the apparatus.

4. A method for controlling the operation of a machine tool as a function of the torque load on a rotating cutting tool caused by said cutting tool being in contact with a workpiece, the said machine tool having a spindle motor for rotating the cutting tool and a feed motor for providing relative motion between the cutting tool and the workpiece in response to command signals from a numerical control, the method comprising the steps of:
(a) detecting
 (1) a current signal representing a spindle motor current occurring within a range of four decades,
 (2) a voltage signal representing a voltage across the spindle motor occurring within a range of two decades, and
 (3) a speed signal representing an angular velocity of the cutting tool occurring within a range of three decades;
(b) converting the current, voltage and speed signals into corresponding log current, log voltage and log speed signals representing the logarithmic values of the current, voltage and speed signals, respectively;
(c) storing the log current, log voltage and log speed signals;
(d) generating in response to the stored signals a torque signal representing a spindle motor torque occurring within a range of five decades;
(e) comparing the torque signal to a predetermined torque reference signal; and
(f) producing a control signal in response to the torque signal exceeding the predetermined torque reference signal to cause the operation of the machine tool to be modified.

5. The method of claim 4 wherein the step of detecting a current signal further comprises the step of detecting a current signal representing spindle motor current over the range of from 100 milliamps to 1000 amps.

6. The method of claim 4 wherein the step of detecting a voltage signal further comprises the step of detecting a voltage signal representing a spindle motor voltage over the range of from 10 volts to 1000 volts.

7. The method of claim 4 wherein the step of detecting a speed signal further comprises the step of detecting a speed signal representing an angular velocity of the cutting tool over a range of from 10 revolutions per minute to 10,000 revolutions per minute.

8. The method of claim 4 wherein the step of determining a torque signal further comprises the step of determining a torque signal representing a torque load on the cutting tool over the range of from less than 0.1 foot pound to more than 1000 foot pounds.

9. The method of claim 4 wherein the order of executing the steps of detecting, converting and storing is further defined by the steps of:
(a) executing the steps of converting and storing a first detected signal before detecting a second signal;
(b) executing the steps of converting and storing the second detected signal before detecting a third signal; and
(c) executing the steps of converting and storing the third detected signal before detecting the first signal another time.

10. The method of claim 4 wherein the step of generating a torque signal further comprises steps of:
(a) producing a log torque signal in response to the difference between the log speed signal and the sum of the log current and log voltage signals; and
(b) generating the torque signal by providing the antilog of the log torque signal.

11. The method of claim 4 wherein the current, voltage and speed signals represent analog values and the method further comprises the step of converting the log current, log voltage and log speed signals into corresponding digital log current, digital log voltage and digital log speed signals respectively.

12. The method of claim 4 wherein the method further comprises the steps of:
(a) executing steps (a) through (d) a predetermined number of times in response to a spindle rotation in the absence of tool contact with the workpiece to produce a predetermined number of idle torque signals;
(b) summing the predetermined number of idle torque signals;
(c) dividing the sum of the predetermined number of idle torque signals by said predetermined number to produce an average idle torque signal;
(d) storing the average idle torque signal; and
(e) subtracting the average idle torque signal from a subsequent torque signal to produce a net torque signal representing the load on the cutting tool exclusively as a function of its contact with the workpiece.

* * * * *